United States Patent Office 3,274,033
Patented Sept. 20, 1966

3,274,033
ULTRASONICS
Stanley E. Jacke, Ridgefield, Conn., assignor, by mesne assignments, to Branson Instruments, Incorporated, a corporation of Delaware
No Drawing. Filed Aug. 12, 1963, Ser. No. 301,592
1 Claim. (Cl. 148—12.9)

This invention relates to ultrasonics and to relieving residual stress in solids. A method for relieving residual stress in metallic weldments is described in detail.

When two pieces of metal are welded together, the solidification of the molten weld metal causes a net contraction along the weld. This contraction produces tensional stresses along the solidified weld, and corresponding compressional stresses along the adjacent base metal. These residual stresses produce a net weakening of welded structures. For example, suppose a metal plate will ultimately yield under a tensional stress of 150,000 lbs. per sq. in. If the metal piece contains a weld having a residual tensional stress along the weld of 100,000 lbs. per sq. in., the welded piece is capable of sustaining only 50,000 lbs. per sq. in. of tensional stress in the direction along the weld.

The problem of residual stresses, particularly tensional stresses, in weldments has increased in importance in recent years because of the need for extremely high strength, low weight structures for use in aircraft air frames and rocket housings. Similar extremely high strength low weight structures are also used in high performance submarines.

A structural material often used in such structures is B–120VCA titanium alloy, which as well as titanium, in weight percent contains substantially 2.5 to 3.5 percent aluminum, 10 to 11 percent chromium, 12.5 to 14 percent vanadium, .05 percent maximum carbon, .08 percent maximum nitrogen, and .025 percent maximum hydrogen. B–120VCA titanium alloy may also contain .26 percent iron and .10 percent oxygen in weight percent.

B–120VCA titanium alloy plate has an ultimate tensional strength of from 165,000 to 190,000 lbs. per sq. in. Butt welded B–120VCA titanium alloy plate, ⅛ of an inch thick, may have a residual tensional stress along the weld of as much as 100,000 lbs. per sq. in. and corresponding residual compressional stresses in the base metal parallel to the weld of as much as 33,000 lbs. per sq. in. Thus, the ultimate yield strength of butt welded titanium alloy plate in the direction along the weld is reduced by these amounts.

It has been known that vibrating a weld ultrasonically with high energy during the process of welding will sometimes refine coarse grains in B–120VCA titanium alloy and in stainless steels such as AISI–304. This reduces the probability of premature failure in the weld due to crack propagation. Various methods for treating weldments ultrasonically during welding are described in Technical Documentary Report No. ASD-TDR–62–993 published in March 1963 under the authority of the Directorate of Materials and Processes, Aeronautical Systems Division, Air Force Systems Command, Wright-Patterson Air Force Base, Ohio.

I have discovered that welds having high residual stresses may be treated ultrasonically after solidification to greatly reduce residual stresses.

It is therefore an object of this invention to reduce residual stresses in solid materials.

It is another object of this invention to reduce residual stresses in metals.

It is a further object of this invention to reduce residual stresses in metallic weldments.

It is still another object of the invention to reduce residual stresses in weldments of B–120VCA titanium alloy.

It is yet another object of the invention to reduce residual tensional stress along butt welds in B–120VCA titanium alloy plate.

Other objects of the invention will in part be obvious and will in part appear hereinafter.

The invention accordingly comprises the method hereinafter disclosed, and the scope of the invention will be indicated in the claim.

For a fuller understanding of the nature and objects of the invention, reference should be had to the following detailed description.

I have discovered that residual tensional stresses in butt welded B–120VCA titanium alloy plate ⅛ of an inch thick may be greatly reduced by applying ultrasonic energy at a frequency of approximately 20 kilocycles directly to the solidified weld at room temperature. I use a high intensity ultrasonic source, namely, the Branson Sonifier high intensity horn transducer, Model S–75, which produces approximately 75 watts of sonic energy at the end of an exponential horn having a front face diameter of ½ inch. This energy is mainly in the form of ultrasonic pressure waves, i.e., vibrational movement perpendicular to the front face of the horn. The Branson Sonifier is disclosed in the co-pending application of Stanley E. Jacke and Henry Biagini, Serial No. 125,568 filed July 20, 1961, entitled "Sonic Disperser." In my method for treating welds the instrument is used with the sonic horn alone, that is, without the mixing chamber and associated apparatus also disclosed in that application.

The ultrasonic horn is pressed against the weld bead under hard hand pressure and run along the weld. In welded B–120VCA titanium alloy plate ⅛ of an inch thick, I have reduced the maximum residual tensional stress along the weld by this method from 100,000 lbs. per sq. in. to 65,000 lbs. per sq. in. When the maximum residual tensional stress was 71,000 lbs. per sq. in. after welding, the above method reduced the residual tensional stress to 58,000 lbs. per sq. in. If ultrasonic energy of the same frequency is applied by immersing these plates in an extremely high intensity ultrasonic cleaning tank, the measured residual tensional stress after processing is unchanged.

When the above direct process—applying the high intensity horn transducer directly to the butt weld of such plates having a maximum residual tensional stress of 71,000 lbs. per sq. in.—is carried out at a temperature of approximately 500° Fahrenheit, the residual tensional stress measured after processing is 72,000 lbs. per sq. in., that is, it is unchanged within the limits of measurement.

When a stainless steel coupling sheet one ten thousandth of an inch thick is interposed between the horn transducer and the weld bead of a ⅛ inch B–120VCA titanium alloy plate during processing at room temperature, the measured residual tensional stress is only reduced from 71,000 lbs. per sq. in. to 70,000 lbs. per sq. in. When this indirect process is carried out at 500° Fahrenheit, the measured residual tensional stress after processing is 72,000 lbs. per sq. in. Thus at both temperatures the indirect process does not change the residual stress within the limits of measurement.

In my opinion the reduction in residual stress occurring when the high intensity ultrasonic horn transducer is pressed directly against the weld at room temperature is caused by the tip of the horn transducer beating directly against the weld at the ultrasonic frequency of the transducer. A horn transducer operating at 20 kilocycles will beat against the weld 20,000 times per second with extremely high forces. I thus introduce into the weld high intensity sonic transient or shock waves of all types—pressure, shear, surface and bending—having some very high frequency components. These waves in some manner not understood reduce the forces between adjacent grains in the metal, allowing them to rotate relative to one another, to reduce the residual stresses.

The method may be used to reduce residual stress in any solid material. In particular, it can be used to reduce residual stress in tools, dies, and the like. The conditions to be filled are that the intensity of the sonic vibrations induced in the material should be as high as possible without cracking or otherwise injuring the material.

It will thus be seen that the objects set forth above, among those made apparent from the preceding description, are efficiently attained, and since certain changes may be made in carrying out the above method without departing from the scope of the invention, it is intended that all matter contained in the above description shall be interpreted as illustrative and not in a limiting sense.

It is also to be understood that the following claim is intended to cover all of the generic and specific features of the invention herein described and all statements of the scope of the invention which as a matter of language might be said to fall therebetween.

Having described my invention, what I claim is new and desire to secure by Letters Patent is:

The method of reducing residual stress in weldments of titanium alloys substantially containing, by weight, 2.5 to 3.5 percent aluminum, 10 to 11 percent chromium, 12.5 to 14 percent vanadium, .05 percent maximum carbon, .08 percent maximum nitrogen, .025 percent maximum hydrogen, and the balance essentially titanium by manually pressing a high intensity ultrasonic transducer producing ultrasonic energy at a frequency of approximately twenty kilocycles per second directly against the bead of the weld at room temperature.

References Cited by the Examiner

UNITED STATES PATENTS

| | | | |
|---|---|---|---|
| 2,032,977 | 3/1936 | Delachaux | 148—127 |
| 2,235,026 | 3/1941 | Kruse | 148—12.9 |

FOREIGN PATENTS

| | | |
|---|---|---|
| 569,598 | 2/1933 | Germany. |
| 879,755 | 10/1961 | Great Britain. |

OTHER REFERENCES

"Bright Future for Ultrasound" by John N. Antonevich, Battelle Technical Review, vol. 5, No. 4, April 1956, pages 9–13.

"Vibration Treatment of Metals" by H. J. Seemann et al., The Journal of the Acoustical Society of America, vol. 29, No. 6, June 1957, pages 698–701.

DAVID L. RECK, *Primary Examiner.*

O. D. MARJAMA, C. N. LOVELL,
*Assistant Examiners.*